(12) United States Patent
Sigmon, Jr. et al.

(10) Patent No.: US 7,506,921 B1
(45) Date of Patent: Mar. 24, 2009

(54) CONVERTIBLE CARSEAT/STROLLER

(76) Inventors: Glenn A. Sigmon, Jr., 22 Hickory Trail, Thomasville, NC (US) 27360; Rita H. Sigmon, Jr., 22 Hickory Trail, Thomasville, NC (US) 27360

( * ) Notice: Subject to any disclaimer, the term of this patent is extended or adjusted under 35 U.S.C. 154(b) by 0 days.

(21) Appl. No.: 11/765,584

(22) Filed: Jun. 20, 2007

(51) Int. Cl.
  *A47C 13/00* (2006.01)
(52) U.S. Cl. ............................ 297/130; 280/30; 280/648
(58) Field of Classification Search ................. 297/130; 280/30, 47.38, 648
  See application file for complete search history.

(56) References Cited

U.S. PATENT DOCUMENTS 4,786,064 A * 11/1988 Baghdasarian .............. 297/130
4,872,692 A * 10/1989 Steenburg ................... 297/130
4,989,888 A *  2/1991 Qureshi et al. ................ 280/30
6,237,995 B1 *  5/2001 Dierickx ................. 297/130 X

* cited by examiner

*Primary Examiner*—Anthony D Barfield

(57) ABSTRACT

A convertible car seat/stroller is disclosed. An illustrative embodiment of the convertible car seat/stroller includes a car seat having a seat portion and a backrest portion. A pair of front wheel wells is provided in the seat portion and a pair of rear wheel wells is provided in the backrest portion. A pair of front wheel supports and a pair of rear wheel supports can be selectively deployed between an extended configuration and a folded configuration in which the pair of front wheels is deployed in the pair of front wheel wells, respectively, and the pair of rear wheels is deployed in the pair of rear wheel wells, respectively.

11 Claims, 6 Drawing Sheets

CONVERTIBLE CARSEAT/STROLLER

FIELD

The present invention relates to strollers for transporting infants and small children. More particularly, the present invention relates to a convertible car seat/stroller which can be selectively used as an infant car seat or a stroller.

BACKGROUND

Strollers are used to transport infants and small children as a caregiver pushes the stroller on a flat surface. Car seats are used to secure infants and small children in a vehicle during operation of the vehicle. When it is necessary to transport a child in a stroller after travel in a vehicle, the infant or child is removed from the car seat and placed in a separate stroller for transport in the stroller. Therefore, the stroller must be carried in the vehicle in addition to the car seat. A convertible car seat/stroller is needed which can be interchangeably used as a car seat or a stroller.

SUMMARY

The present invention is generally directed to a convertible car seat/stroller. An illustrative embodiment of the convertible car seat/stroller includes a car seat having a seat portion and a backrest portion. A pair of front wheel wells is provided in the seat portion and a pair of rear wheel wells is provided in the backrest portion. A pair of front wheel supports and a pair of rear wheel supports can be selectively deployed between an extended configuration and a folded configuration in which the pair of front wheels is deployed in the pair of front wheel wells, respectively, and the pair of rear wheels is deployed in the pair of rear wheel wells, respectively.

BRIEF DESCRIPTION OF THE DRAWINGS

The invention will now be described, by way of example, with reference to the accompanying drawings, in which.

DETAILED DESCRIPTION

Figure 1:
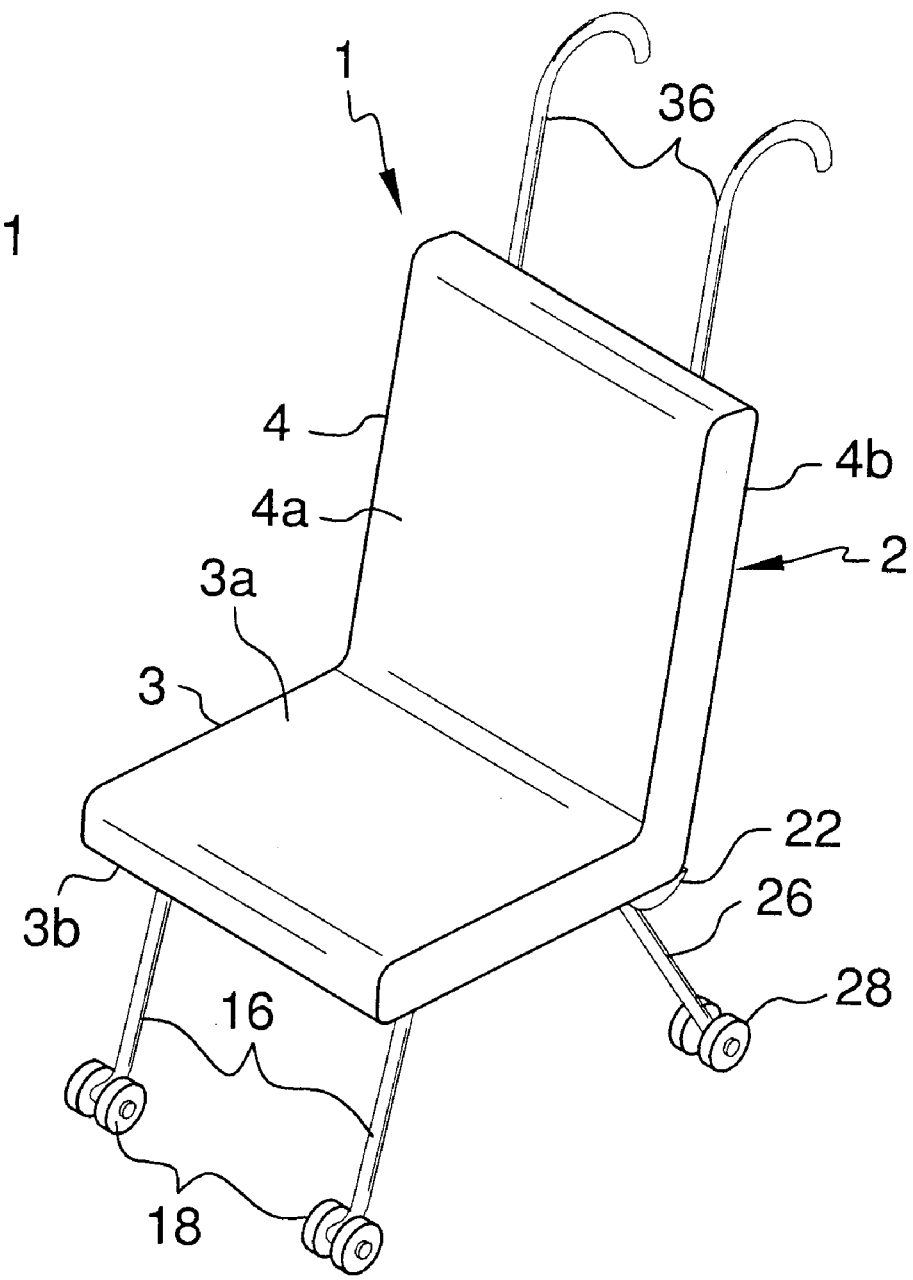
FIG. 1 is a front perspective view of an illustrative embodiment of the convertible car seat/stroller, deployed in a stroller configuration.
Figure 2:
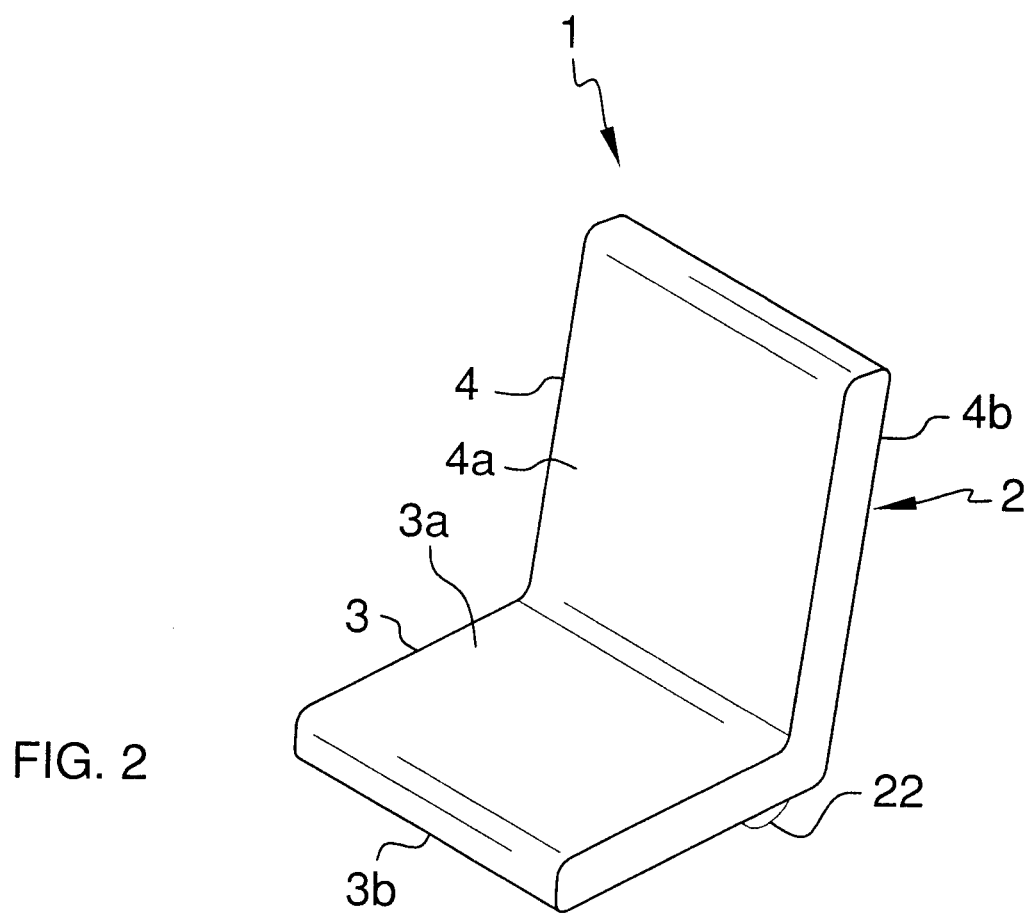
FIG. 2 is a front perspective view of an illustrative embodiment of the convertible car seat/stroller, deployed in a car seat configuration.

Referring to the drawings, an illustrative embodiment of the convertible car seat/stroller is generally indicated by reference numeral 1. The convertible car seat/stroller 1 includes a car seat 2 having a seat portion 3 and a backrest portion 4 which extends from the seat portion 3. The seat portion 3 and the backrest portion 4 of the car seat 2 may be rigid or semi-rigid, flexible, molded plastic, for example. As shown in FIGS. 1 and 2, the seat portion 3 has an upper support surface 3a and a generally flat, planar rear surface 3b. The backrest portion 4 has a front support surface 4a and a generally flat, planar rear surface 4b.

Figure 4:
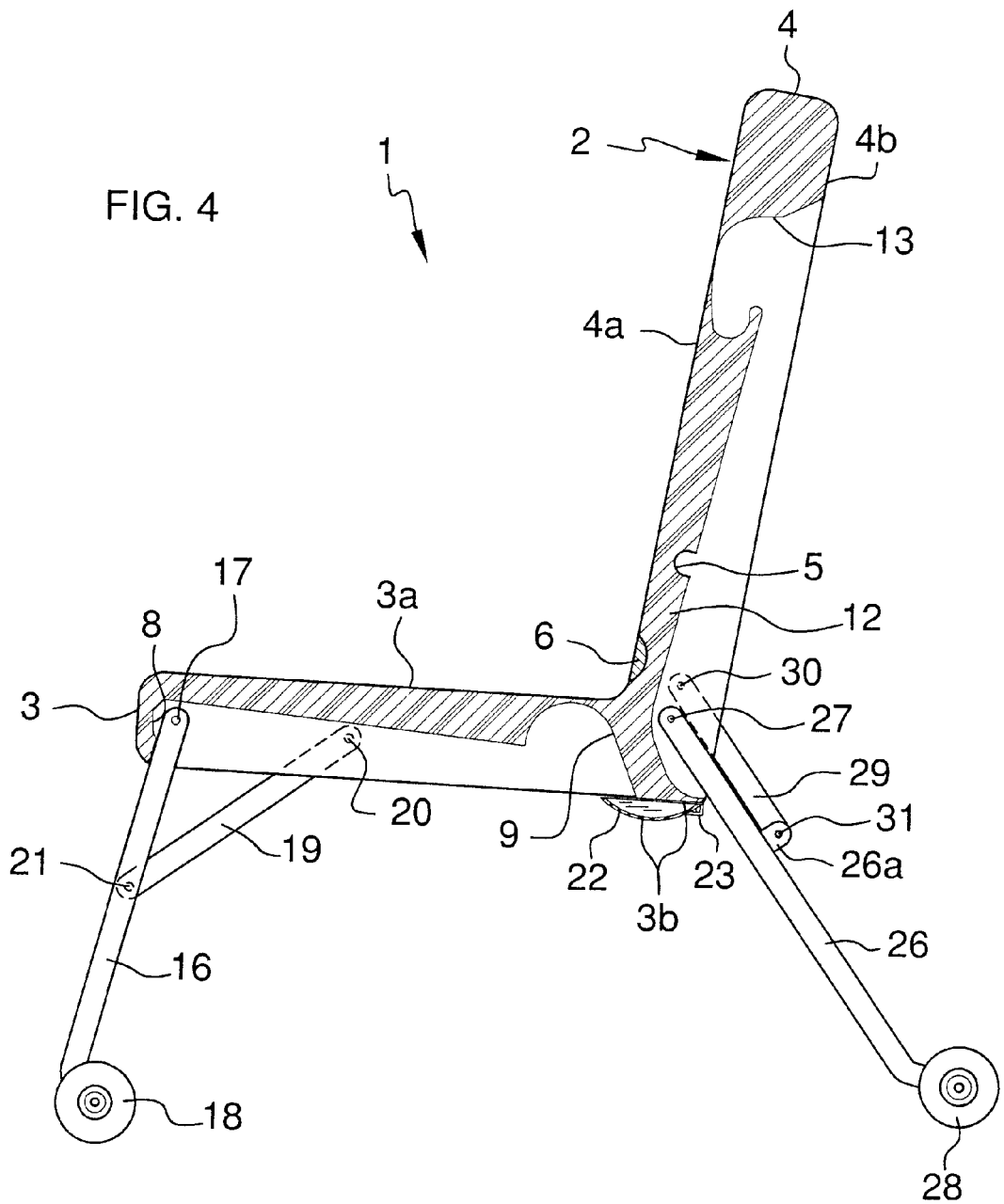
FIG. 4 is a cross-sectional view of an illustrative embodiment of the convertible car seat/stroller, with the convertible car seat/stroller deployed in the stroller configuration.

As shown in FIG. 4, a seatbelt attachment frame 6 is provided on the backrest surface 4a of the seat portion 4. The seatbelt attachment frame 6 may have any design which is suitable for the purpose of attaching the car seat 2 to a seatbelt (not shown) provided in a vehicle (not shown).

Figure 3:
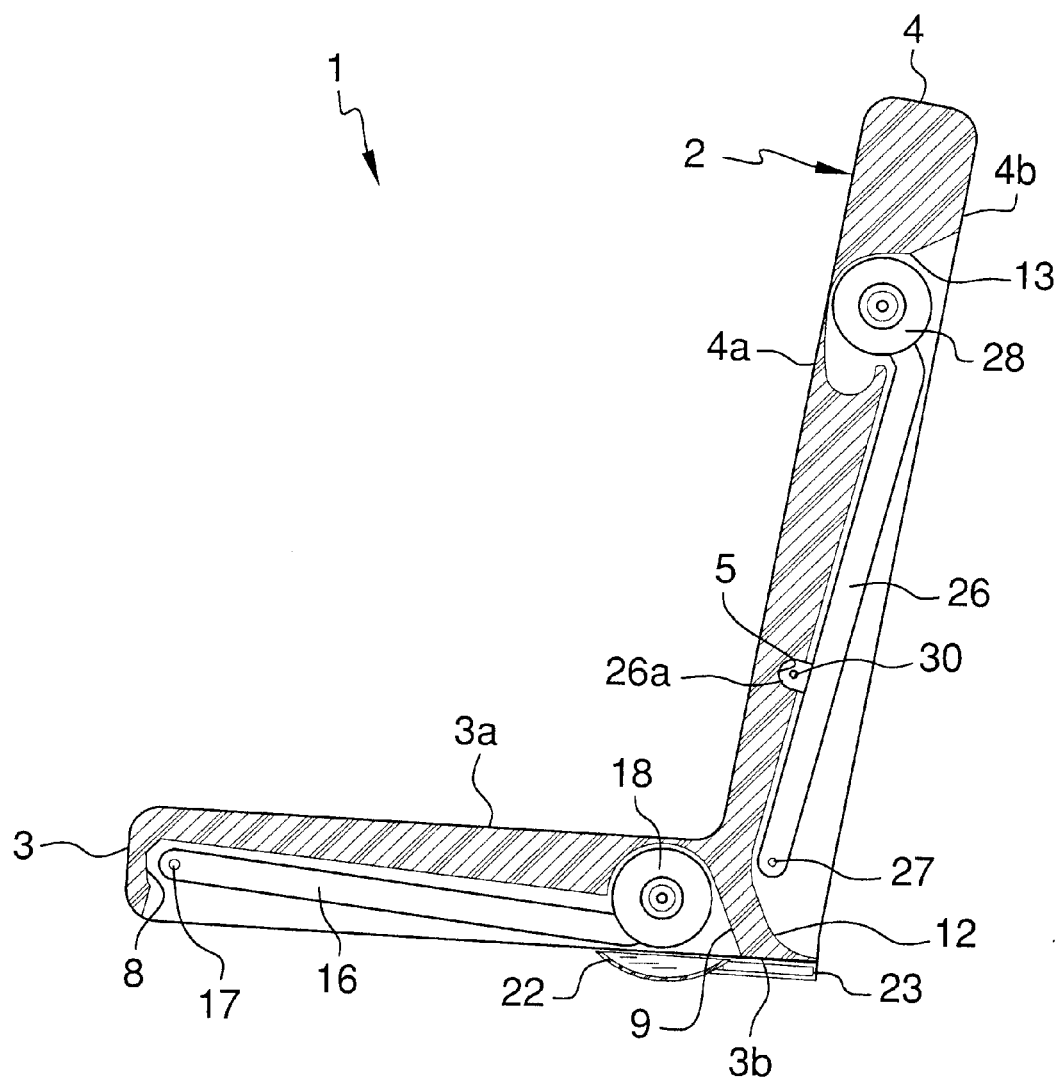
FIG. 3 is a cross-sectional view of an illustrative embodiment of the convertible car seat/stroller, with a front wheel positioned in a front wheel well and a rear wheel positioned in a rear wheel well when the convertible car seat/stroller is deployed in the car seat configuration.

As shown in FIGS. 3 and 4, a pair of spaced-apart front wheel support cavities 8 (one of which is shown) is provided in the bottom surface 3b of the seat portion 3. A pair of front wheel wells 9 (one of which is shown) is provided in the bottom surface 3b and typically communicates with the respective front wheel support cavities 8. A pair of spaced-apart rear wheel support cavities 12 (one of which is shown) is provided in the rear surface 4b of the backrest portion 4. A pair of rear wheel wells 13 (one of which is shown) is provided in the rear surface 4b and typically communicates with the respective rear wheel support cavities 12. As further shown in FIG. 4, a pair of flange cavities 5 (one of which is shown) may communicate with each rear wheel support cavity 12 for purposes which will be hereinafter described.

Figure 5:
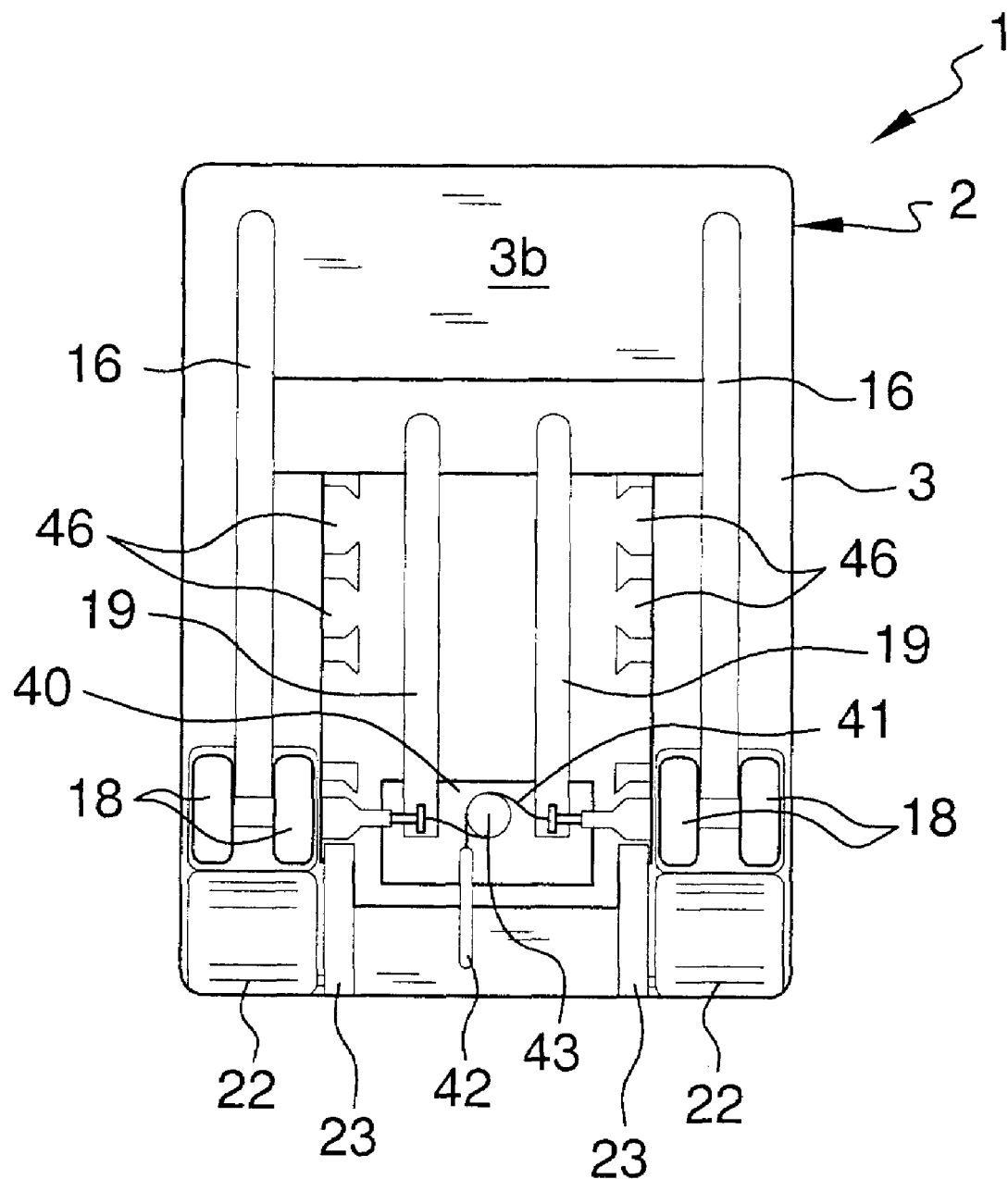
FIG. 5 is a bottom view of a seat portion of an illustrative embodiment of the convertible car seat/stroller, deployed in the car seat configuration.

A pair of elongated front wheel supports 16 is pivotally attached, each via a pivot pin 17, to the seat portion 3 in each front wheel support cavity 8. At least one front wheel 18 is provided on each front wheel support 16. In some embodiments, an elongated front wheel support brace 19 is pivotally attached to a front wheel locking mechanism 40 (FIG. 5) via a pivot pin 20 and to each corresponding front wheel support 16 via a pivot pin 21. Accordingly, as shown in FIG. 3, each front wheel support 16 can be selectively pivoted to lie within the corresponding front wheel support cavity 8 with the at least one front wheel 18 disposed in the corresponding front wheel well 9. As shown in FIG. 4, each front wheel support 16 can be selectively pivoted from the corresponding front wheel support cavity 8 to the extended, functional configuration with the front wheel support brace 19 extending between the front wheel locking mechanism 40 and the front wheel support 16. As shown in FIG. 5, in some embodiments a pair of front wheel adjustment cables 41 extends from the respective front wheel supports 16 and terminates in a cable handle 42. Each front wheel adjustment cable 41 can be selectively attached to the front wheel locking mechanism 40 to selectively secure the at least one front wheel 18 in the front wheel support cavity 8. In some embodiments, the at least one front wheel 18 is height adjustable. For example, as further shown in FIG. 5, multiple front wheel adjustment slots 46 may be provided in the seat portion 3 of the car seat 2. The front wheel supports 16 are adapted to engage selective ones of the front wheel adjustment slots 46 to secure the front wheel supports 16 and the respective front wheels 18 at a selected length with respect to the seat portion 3 of the car seat 2.

As shown in FIGS. 3-5, in some embodiments a pair of front wheel covers 22 is provided on the bottom surface 3b of the seat portion 3 to cover each at least one front wheel 18 when the at least one front wheel 18 is disposed in the corresponding front wheel well 9. Each front wheel cover 22 may be slidably mounted on a corresponding cover track 23 which is provided on the bottom surface 3b of the seat portion 3 to facilitate selective sliding of the front wheel cover 22 between the wheel-covering position shown in FIG. 3 and the wheel-uncovering position shown in FIG. 4.

Figure 6:
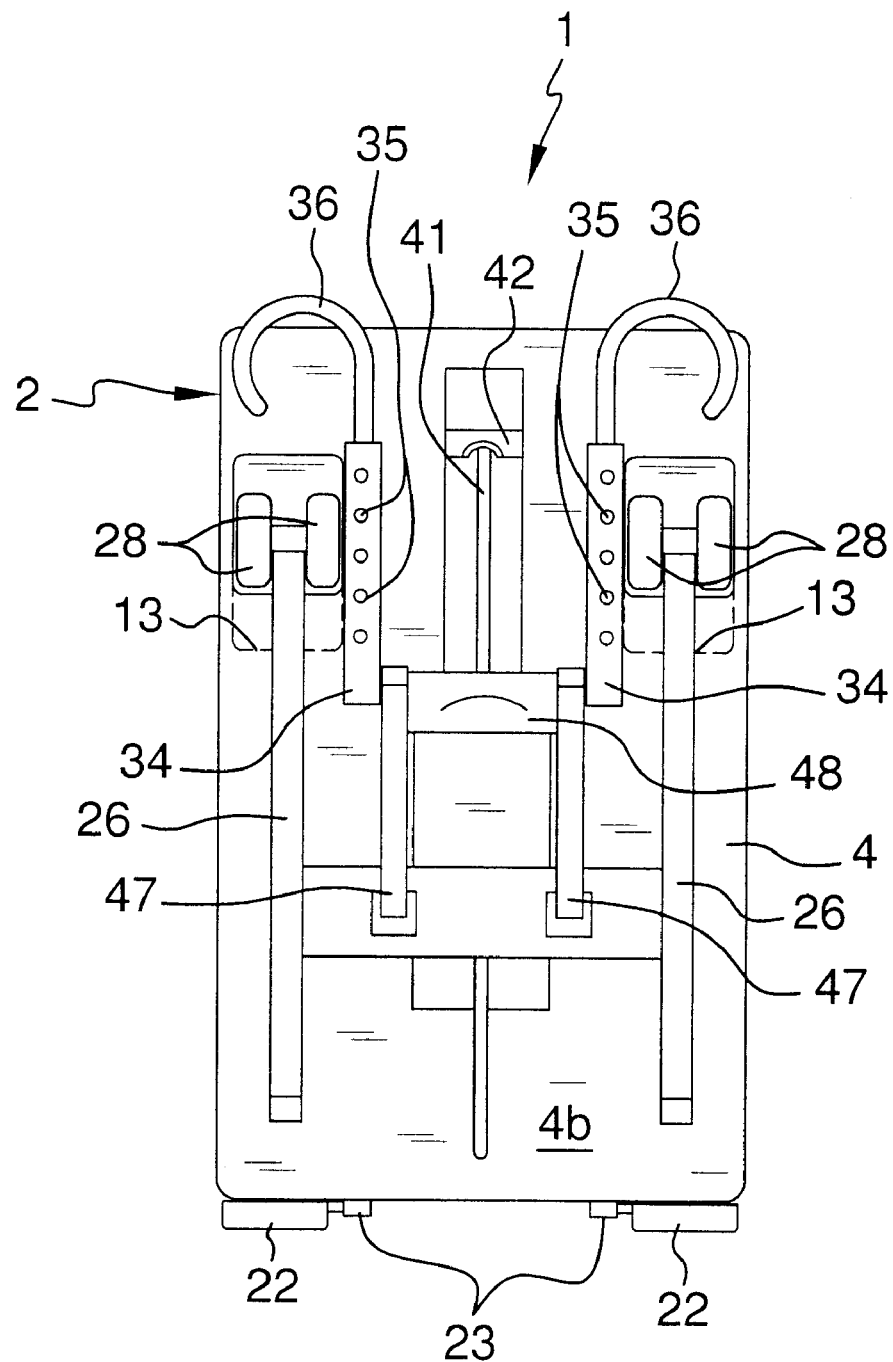
FIG. 6 is a rear view of a backrest portion of an illustrative embodiment of the convertible car seat/stroller, deployed in the car seat configuration.

A pair of elongated rear wheel supports 26 is pivotally attached, each via a pivot pin 27, to the backrest portion 4 in each rear wheel support cavity 12. At least one rear wheel 28 is provided on each rear wheel support 26. In some embodiments, an elongated rear wheel support brace 29 is pivotally attached to a rear wheel adjustment handle 48 (FIG. 6) via a pivot pin 30. A flange 26a is typically provided on each rear wheel support 26, and the rear wheel support brace 29 is pivotally attached to the flange 26a via a pivot pin 31. Accordingly, as shown in FIG. 3, each rear wheel support 26 can be selectively pivoted to lie within the corresponding rear wheel support cavity 12, with the at least one rear wheel 28 disposed in the corresponding rear wheel well 13 and the flange 26a on the rear wheel support 26 inserted in the flange cavity 5. As shown in FIG. 4, each rear wheel support 26 can be selectively pivoted from the corresponding rear wheel support cavity 12 to the extended, functional configuration with the rear wheel support brace 29 extending between the backrest portion 4 and the rear wheel support 26. Therefore, when it is deployed in the configuration shown in FIG. 3, the convertible car seat/stroller 1 can be used as a car seat to secure an infant or small child (not shown) in a vehicle (not shown). When it is deployed in the configuration shown in FIG. 4, the convertible car seat/stroller 1 can be used as a stroller to transport an infant or small child as the infant or child sits on the car seat 2. In some embodiments, the at least one rear wheel 28 is height-adjustable with respect to the backrest portion 4 of the car seat 2. For example, multiple rear wheel adjustment slots (not shown) may be provided in the backrest portion 4. The rear wheel supports 26 are adapted to engage selective ones of the rear wheel adjustment slots to secure the rear wheel supports 26 and the respective rear wheels 28 at a selected length with respect to the seat portion 3 of the car seat 2. As shown in FIG. 6, a rear wheel adjustment handle 48 may be provided on the rear wheel supports 26 to facilitate selective raising and lowering of the rear wheels 28.

As shown in FIGS. 1 and 6, in some embodiments a pair of handles 36 is selectively extendable from the backrest portion 4 of the car seat 2 to facilitate pushing of the car seat 2 when it is deployed in the stroller configuration. As shown in FIG. 6, in some embodiments a pair of spaced-apart handle receptacles 34, each having multiple pin openings 35, is provided on the rear surface 4b of the backrest portion 4. The handles 36 are telescopically extendable from the respective handle receptacles 34. A pin (not shown) can be extended through a selected one of the pin openings 35 provided in each handle receptacle 34 and through a registering pin opening (not shown) provided in the handle 36 to secure a selected length of each handle 36 from the corresponding handle receptacle 34.

In typical use, the convertible car seat/stroller 1 can be selectively used as a car seat in which an infant or small child (not shown) is seated in the car seat 2 during transport in the vehicle. Accordingly, the front wheel supports 16 and front wheels 18 are deployed in the respective front wheel support cavities 8 and front wheel wells 9, and the rear wheel supports 26 and rear wheels 28 are deployed in the respective rear wheel support cavities 12 and rear wheel wells 13, as shown in FIG. 3. The front wheel covers 22 are typically deployed in the covering position shown in FIG. 3 to cover the respective front wheels 18 as they are nested in the respective front wheel wells 9. The seat portion 4 of the car seat 2 is attached to the vehicle seat (not shown) of the car seat typically by extending the seatbelt (not shown) of the vehicle through the seatbelt attachment frame 6 (FIG. 4) provided on the seat portion 4 and fastening the seatbelt. Straps (not shown) are typically provided on the seat portion 3 and/or the backrest portion 4 of the car seat 2 for fastening around the infant or small child (not shown) as the infant or child sits in the car seat 2. The infant or child can therefore be transported in a secure manner in the vehicle as the infant or child sits in the car seat 2.

The convertible car seat/stroller 1 can be used as a stroller to transport an infant or child by detaching the car seat 2 from the seatbelt inside the vehicle and extending the front wheel supports 16 and rear wheel supports 26 from the front wheel support cavities 8 in the seat portion 3 and the rear wheel support cavities 12 in the backrest portion 4, respectively, as shown in FIG. 4. The front wheel covers 22 are first repositioned from the wheel-covering position shown in FIG. 3 to the wheel-uncovering position shown in FIG. 4 prior to removal of the front wheels 18 from the respective front wheel wells 9. The handles 36 are typically extended from the respective handle receptacles 34 (FIG. 6) and locked. The infant or child is seated on the seat portion 3 and typically strapped to the car seat 2. Accordingly, the front wheels 18 and rear wheels 28 support the car seat 1 on a flat surface (not shown) as a caregiver (not shown) grasps the handles 36 and pushes the car seat 1 over the surface. The convertible car seat/stroller 1 can subsequently again be used as a car seat, as desired, by folding the front wheel supports 16 and front wheels 18 into the respective front wheel support cavities 8 and front wheel wells 9 and folding the rear wheel supports 26 and rear wheels 28 into the respective rear wheel support cavities 12 and rear wheel wells 13, as shown in FIG. 3, typically as was heretofore described.

While the preferred embodiments of the invention have been described above, it will be recognized and understood that various modifications can be made in the invention and the appended claims are intended to cover all such modifications which may fall within the spirit and scope of the invention.

What is claimed is:

1. A convertible car seat/stroller, comprising:
    a car seat having a seat portion and a backrest portion extending from said seat portion;
    a pair of front wheel wells provided in said seat portion; a pair of front wheel covers carried by said seat portion and adapted to selectively cover said pair of front wheel wells, respectively;
    a pair of rear wheel wells provided in said backrest portion;
    a pair of front wheel supports pivotally carried by said seat portion and a pair of front wheels carried by said pair of front wheel supports, respectively;
    wherein said pair of front wheel supports can be selectively deployed between an extended configuration and a folded configuration wherein said pair of front wheels is deployed in said pair of front wheel wells, respectively;
    a pair of rear wheel supports pivotally carried by said backrest portion and a pair of rear wheels carried by said pair of rear wheel supports, respectively; and
    wherein said pair of rear wheel supports can be selectively deployed between an extended configuration and a folded configuration wherein said pair of rear wheels is deployed in said pair of rear wheel wells, respectively.

2. The convertible car seat/stroller of claim 1 further comprising a pair of front wheel support cavities provided in said seat portion and wherein said pair of front wheel supports is deployed in said pair of front wheel support cavities, respectively, in said folded configuration.

3. The convertible car seat/stroller of claim 2 wherein said pair front wheel support cavities communicates with said pair of front wheel wells, respectively.

4. The convertible car seat/stroller of claim 1 further comprising a pair of rear wheel support cavities provided in said backrest portion and wherein said pair of rear wheel supports is deployed in said pair of rear wheel support cavities, respectively, in said folded configuration.

5. The convertible car seat/stroller of claim 4 wherein said pair rear wheel support cavities communicates with said pair of rear wheel wells, respectively.

6. The convertible car seat/stroller of claim 1 further comprising a pair of cover tracks provided on said seat portion and wherein said pair of wheel covers is slidably carried by said pair of cover tracks, respectively.

7. The convertible car seat/stroller of claim 1 further comprising a pair of front wheel support braces pivotally attached to said seat portion and said pair of front wheel supports, respectively.

8. The convertible car seat/stroller of claim 1 further comprising a pair of rear wheel support braces pivotally attached to said seat portion and said pair of rear wheel supports, respectively.

9. The convertible car seat/stroller of claim 1 further comprising a seatbelt attachment frame provided on said seat portion.

10. A convertible car seat/stroller, comprising,
a car seat having a seat portion including a generally flat, planar bottom surface and a backrest portion extending from said seat portion and including a generally flat, planar rear surface;
a pair of front wheel wells provided in said bottom surface of said seat portion;
a pair of front wheel covers carried by said bottom surface of said seat portion and adapted to selectively cover said pair of front wheel wells, respectively;
a pair of rear wheel wells provided in said rear surface of said backrest portion;
a pair of front wheel supports pivotally carried by said seat portion and a pair of front wheels carried by said pair of front wheel supports, respectively;
wherein said pair of front wheel supports can be selectively deployed between an extended configuration and a folded configuration wherein said pair of front wheels is deployed in said pair of front wheel wells, respectively;
a pair of rear wheel supports pivotally carried by said backrest portion and a pair of rear wheels carried by said pair of rear wheel supports, respectively;
wherein said pair of rear wheel supports can be selectively deployed between an extended configuration and a folded configuration wherein said pair of rear wheels is deployed in said pair of rear wheel wells, respectively; and
a seatbelt attachment frame provided on said seat portion.

11. The convertible car seat/stroller of claim 10 further comprising a pair of cover tracks provided on said seat portion and wherein said pair of wheel covers is slidably carried by said pair of cover tracks, respectively.

* * * * *